_United States Patent Office_

3,510,469
Patented May 5, 1970

3,510,469
SCARLET PHENYL-AZO-NAPHTHOL DYES
Hiroshi Sugiyama, Ashiya-shi, Hideo Otsuka Ibaraki-shi, and Masakazu Yamamoto, Takarazuka-shi, Japan, assignors to Sumitomo Chemical Company, Ltd., Osaka, Japan, a Japanese corporation
No Drawing. Filed Dec. 9, 1966, Ser. No. 600,380
Claims priority, application Japan, Dec. 13, 1965, 40/76,865
Int. Cl. C07c 107/08; C09b 29/16
U.S. Cl. 260—200       7 Claims

---

ABSTRACT OF THE DISCLOSURE

A scarlet monoazo dye having the formula

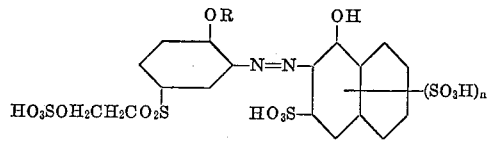

wherein R means methyl or ethyl radical and $n$ means in integer of 1 to 2.

---

This invention relates to novel scarlet monoazo dyes, process for the production thereof and process for dyeing fibers in scarlet tint with the same.

More specifically, this invention relates to novel scarlet monoazo dyes represented by the following formula

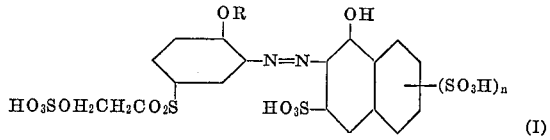

wherein R means methyl or ethyl radical and $n$ means an integer of 1 to 2, and process for the production thereof. It also relates to process for dyeing fibers, especially fibers made from a member of natural or regenerated cellulose materials such as cotton, hemp and viscose rayon and polyvinyl alcohol materials in scarlet tint with the said dyes of the Formula I.

So far, several kinds of reactive dyes have been known respectivelyy with different characteristics distinguished by each reactive radical.

This kind of dyyes characterized by a sulfatoethyl sulfone radical are, however, lacking in dyes suitable for dyeing fibers in valuable scarlet tint.

For example, a dye having the formula

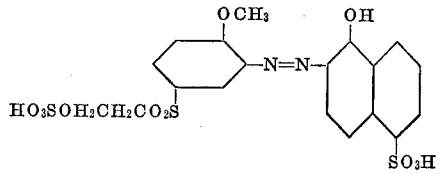

has been disclosed in Japanese patent publication No. 1989/1951, which has been employed for dyeing fibers in red tint.

The present inventors have broadly studied the dyes for dyeing fibers in scarlet tint, which has been strongly requested in this industry.

Surprising is the finding that the requested dye, namely those suitable for dyeing fibers in scarlet tint, can be obtained by employing, as the coupling component, a 1-hydroxynaphthalenepolysulfonic acid having one sulfonic acid radical at 3-position of the said naphthalene nucleus and one or two other sulfonic acid radicals at other optional position or positions, and as the diazo component amines of the formula

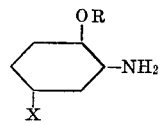

wherein R has the same meanings as defined above and X means a radical of  or

—SO₂CH₂CH₂OSO₃H

Thus one object of the present invention is to provide a novel monoazo dye suitable for dyeing fibers in scarlet tint with high fastnesses.

Another object of the present invention is to provide process for the production of the said dye. Still another object of the present invention is to provide process for dyeing fibers in scarlet tint.

Further objects of the present invention will be apparent from the following detailed descriptions.

The present inventors have found that these and other objects of the present invention can be accomplished by provision of a novel scarlet monoazo dye represented by the following formula

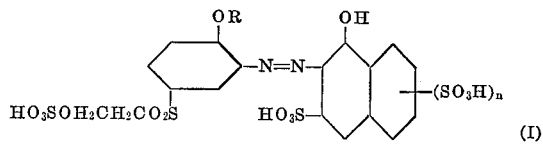

wherein R means methyl or ethyl radical and $n$ means an integer of 1 to 2, and process for the production of the same, which comprises contacting a diazotized amine represented by the following formula

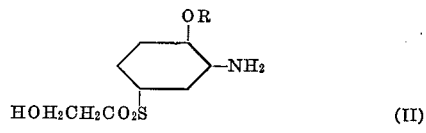

wherein R has the same meanings as defined above, with a 1-hydroxynaphthalenepolysulfonic acid represented by the following formula,

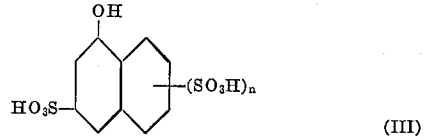

wherein $n$ has the same meanings as defined above, and esterfying the thus-formed dye with sulfuric acid at the hydroxy radical of the β-hydroxyethylsulfone radical according to the conventional esterifying procedures, or contacting a diazotized amine represented by the following formula

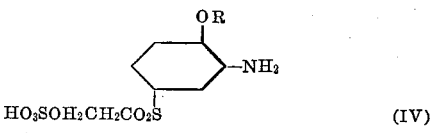

wherein R has the same meanings as defined above, with a 1-hydroxynaphthalenepolysulfonic acid as defined above In the present invention, method for dyeing fibers is also provided, which comprises contacting fibers with the present dyes represented by the Formula I in the presence of acid binding agents.

A full understanding on the present invention can be given with reference to the following detailed illustrations.

In the present invention, 2-methoxyaniline - 5-β-hydroxyethylsulfone, 2-ethoxyaniline - 5-β-hydroxyethylsulfone and the sulfuric acid esters thereof are advantageously employed as the diazo component.

As 1-hydroxynaphthalenepolysulfonic acids (III) employed in the present invention, 1-hydroxynaphthalene-3,6-disulfonic acid, 1-hydroxynaphthalene-3,8-disulfonic acid, 1-hydroxynaphthalene-3,6,8-trisulfonic acid are exemplified, but they are, of course, not to limit the scope of the present invention.

In carrying out the present invention, 1 mol of the amine of the Formula II is diazotized with hydrochloric acid and aqueous sodium nitrite solution according to the conventional diazotizing procedures and the resulting diazo mixture is successively introduced into the solution previously prepared by dissolving at least 1 mol of a 1-hydroxynaphthalenepolysulfonic acid of the Formula III in water, the reaction mixture being maintained within pH 4 to 7 during the course of the reaction by addition of an aqueous sodium carbonate solution.

After the reaction is over, potassium chloride is added to the mixture to precipitate crystals, which are separated by filtration and dried.

The resulting crystals are added to sulfuric acid of 100A strength and the mixture is stirred for a sufficient period of time to complete the esterification reaction. While, amines of the Formula IV are treated with a 1-hydroxynaphthalenepolysulfonic acid of the Formula III according to the same way as mentioned above with the exception of esterification after coupling reaction.

Thus, the objective dyes, which may be employed for dyeing fibers in scarlet tint, are obtained.

Hereon, the present coupling reaction may be advantageously controlled at the pH range of between 4 and 7. In case of controlling the reaction at the pH range higher than that, the dyes suitable for dyeing fibers in requested scarlet tint can be hardly obtained in pure quality. More concretely speaking about this reason, the coupling reaction tends to be oriented at 4-position at relatively high pH range. Besides the amines of the Formula IV, namely amines previously esterified with sulfuric acid could not be employed without decomposition at such higher pH range. On the other hand, in case of controlling at the pH range less than 4, it takes too much long reaction period of time for the completion.

The dyes in the present invention are suitable for dyeing various kinds of fibers, especially fibers made from a member of natural or regenerated cellulose materials such as cotton, hemp and viscose, rayon and polyvinyl alcohol materials, in scarlet tint.

The dyeing in accordance with the present invention is effected in the presence of acid binding agents by the methods such as impregation, printing and padding. It is also possible by fixing the dyes with the acid binding agents after printing or padding without any fixing agents. The dyeings obtained in accordance with the present invention are distinguished by scarlet tint and high fastnesses to wet processing, light, chlorine resistance and acid boiling.

The present invention will be illustrated more concretely with reference to the following examples, which are given by way of mere illustration and not by way of limitation of the scope of the present invention.

All parts and percentages are by weight.

EXAMPLE 1

23.1 parts of 2-methoxyaniline-5-β-hydroxyethylsulfone is introduced into 114 parts of sulfuric acid of 98% strength at a temperature of 15° to 30° C. and the mixture is stirred for 1 hour.

Thereafter, the reaction mixture is poured onto 342 parts of ice and water, thereby to precipitate crystals, which are separated by filtration.

The sulfuric acid ester obtained is introduced into 120 parts of ice and water and diazotized with 8.4 parts of hydrochloric acid and 6.35 parts of sodium nitrite in aqueous solution under cooling.

The resulting diazo mixture is added dropwise into a solution previously prepared by dissolving 31.5 parts of 1-hydroxynaphthalene-3,6-disulfonic acid in 300 parts of water, together with 5.3 parts of sodium carbonate, the reaction mixture being maintained within the pH 6 to 7 during the course of the reaction by addition of about 11 parts of sodium bicarbonate.

After the reaction is over, 110 parts of potassium chloride is added thereto to precipitate crystals, which are separated by filtration and dried.

Thus, a novel monoazo dye having the following formula

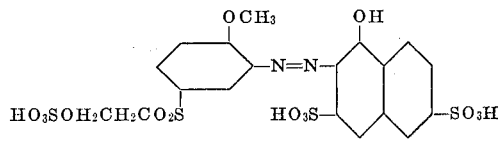

is obtained.

The dye obtained gives characteristic scarlet dyeings of 5 degree of fastnesses to light, washing, chlorine resistance and acid boiling respectively, and of a high brilliancy on cotton with the aid of sodium carbonate as an acid binding agent through the usual dyeing method for the fibre reactive dyes.

Hereon, 1-hydroxynaphthalene-3,8-disulfonic acid instead of 1-hydroxynaphthalene-3,6-disulfonic acid employed above is treated in similar way as mentioned above, thereby to obtain a similar novel dye for the same purposes.

Further, by employing 2-ethoxyaniline-5-β-hydroxyethylsulfone, instead of 2-methoxyaniline-5-β-hydroxyethylsulfone employed above, a similar novel dye for the same purposes may be also obtained.

EXAMPLE 2

23.1 parts of 2-methoxyaniline-5-β-hydroxyethylsulfone is dissolved in 200 parts of ice and water with 10 parts of 35% hydrochloric acid and diazotized with 6.9 parts of sodium nitrite in aqueous solution under cooling.

The resulting diazo mixture is introduced dropwise into a solution previously prepared by dissolving 42 parts of 1-hydroxynaphthalene-3,6,8-trisulfonic acid in 300 parts of water, together with 15 parts of sodium carbonate, while being cooled. After the reaction is over, 100 parts of potassium chloride is added to precipitate crystals, which are separated by filtration and dried.

The crystals obtained above are dissolved in 150 parts of 100% sulfuric acid at temperature of 20° C.

After 2 hour stirring, the reaction mixture is poured onto 300 parts of ice and water and 40 parts of potassium chloride is added thereto to precipitate crystals, which are separated by filtration. The separated crystals are dissolved in 300 parts of water by addition of potassium carbonate to adjust the pH to 6 to 7.

Thereafter, 45 parts of potassium chloride are further added thereto to precipitate crystals, which are separated by filtration and dried.

Thus a novel dye having the following formula

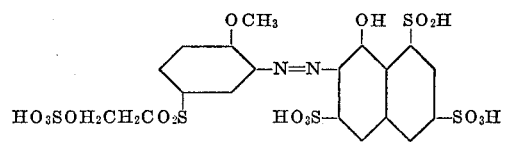

is obtained.

The dye obtained gives characteristic scarlet dyeing of 5 degree of fastness to light, washing, chlorine resistance and acid boiling respectively and of a high brilliancy on cotton with the aid of sodium hydroxide as an acid binding agent through the usual dyeing method for the fiber reactive dyes.

While, by employing 2-ethoxyaniline-5-β-hydroxyethylsulfone, instead of 2-methoxyaniline-5-β-hydroxyethylsulfone employed above, a similar novel dye for the same purposes may be also obtained according to the similar way mentioned above.

What we claim is:

1. A scarlet monoazo dye represented by the following formula:

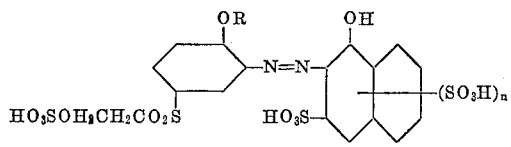

wherein R means methyl or ethyl radical and $n$ means an integer of 1 to 2.

2. A scarlet monoazo dye represented by the following formula:

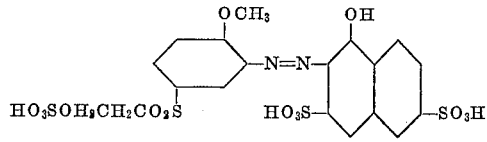

3. A scarlet monoazo dye represented by the following formula:

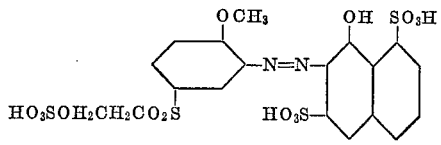

4. A scarlet monoazo dye represented by the following formula:

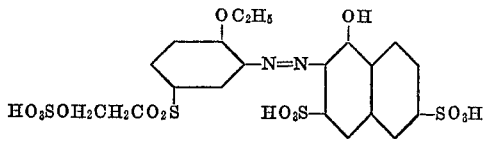

5. A scarlet monoazo dye represented by the following formula:

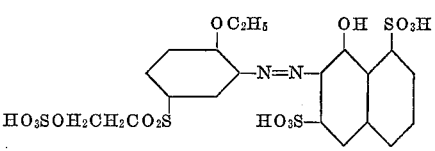

6. A scarlet monoazo dye represented by the following formula:

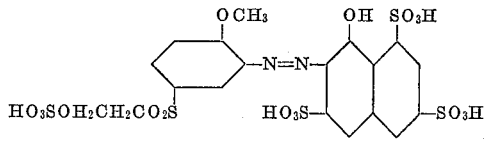

7. A scarlet monoazo dye represented by the following formula:

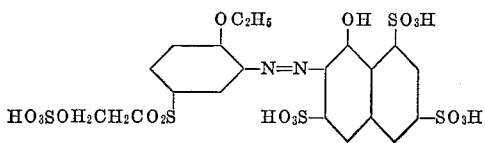

References Cited
UNITED STATES PATENTS

| | | | |
|---|---|---|---|
| 3,135,730 | 6/1964 | Heyna et al. | 260—200 |
| 3,202,652 | 8/1965 | Meininger et al. | 260—200 |

CHARLES B. PARKER, Primary Examiner

C. F. WARREN, Assistant Examiner

U.S. Cl. X.R.

8—41, 50, 51